United States Patent [19]
Hluchyj et al.

[11] Patent Number: 5,488,609
[45] Date of Patent: Jan. 30, 1996

[54] DYNAMIC RATE ADJUSTMENT FOR OVERLOAD CONTROL IN COMMUNICATION NETWORKS

[75] Inventors: Michael G. Hluchyj, Wellesley; Whay C. Lee, Cambridge, both of Mass.

[73] Assignee: Motorola, Inc., Schaumburg, Ill.

[21] Appl. No.: 496,350

[22] Filed: Jun. 29, 1995

Related U.S. Application Data

[63] Continuation of Ser. No. 123,773, Sep. 20, 1993, abandoned.

[51] Int. Cl.[6] .................................................. H04J 3/22
[52] U.S. Cl. .................................. 370/84; 370/54; 370/79
[58] Field of Search ............................. 370/84, 32.1, 54, 370/60, 79, 95.1, 95.3

[56] References Cited

U.S. PATENT DOCUMENTS

| | | | |
|---|---|---|---|
| 3,639,693 | 2/1972 | Bartlett et al. | 370/84 |
| 5,007,047 | 4/1991 | Sridhar et al. | 370/32.1 |
| 5,023,869 | 6/1991 | Grover et al. | 370/84 |
| 5,115,429 | 5/1992 | Hluchyj et al. | 370/84 |
| 5,276,677 | 1/1994 | Ramamurthy et al. | 370/60 |
| 5,301,191 | 4/1994 | Otani | 370/84 |

OTHER PUBLICATIONS

W. Lee & P. Kamat, "Integrated Packet Networks with Quality of Service Constraints," Proc. of IEEE GLOBECOM '91, pp. 8A.3.1–8A.3.5. Dec. 2–5, 1991.

W. Lee & P. Kamat, "Quality of Service Matching for Integrated Fast Packet Networks," Proc. of IEEE GLOBECOM '92, pp. 931–937, Dec. 6–9, 1992.

A. Weinrib & G. Gopal, "Limited Waiting: An Adaptive Overload Control Strategy for Circuit Switched Networks", A. Weinrib & G. Gopal, IEEE Journal on Selected Areas in Communications, vol. 9, No. 2, Feb. 1991.

*Primary Examiner*—Douglas W. Olms
*Assistant Examiner*—Shiok Hom
*Attorney, Agent, or Firm*—Darleen J. Stockley

[57] ABSTRACT

A device (500) and method (300) provide for management of resource allocation on selected links in a connection-oriented communication network such that existing connections may share the burden of freeing up resources for accommodating new connections. The rate of a connection is dynamically adjusted, on a connection-by-connection basis, using information on the status of each link broadcast throughout the network. Links are marked based on control information in the link state, and the in-call rate adjustment is based on negotiable Quality of Service, QOS, parameters.

5 Claims, 5 Drawing Sheets

DYNAMIC RATE ADJUSTMENT FOR OVERLOAD CONTROL IN COMMUNICATION NETWORKS

This is a continuation of application Ser. No. 08/123,773, filed Sep. 20, 1993 and now abandoned.

FIELD OF THE INVENTION

This invention is generally directed to capacity overload in a packet network and is more specifically directed to dynamically adjusting a rate of a connection for overload control.

BACKGROUND

In a connection-oriented communication network, the transfer of information between two end-users is accomplished by network functions that select and allocate network resources along an acceptable path. The logical association between the communicating end-users is referred to as a call. The chain of associated network resources that support the call forms a connection. Connection management is a network function that is responsible for setting up, maintaining, and taking down connections. Each call request is issued with a set of quality of service (QOS) requirements that govern the resource allocation for the desired connection. QOS requirements for a connection may be specified in terms of performance constraints (e.g., throughput, delay), resource constraints (e.g., carrier, security), and priority constraints (e.g., establishment priority, retention priority).

Conventional allocation of network resources for connection management is generally static. A fixed level of quality of service, specified by the user, is to be matched at connection setup for a call and must be maintained by best efforts throughout the duration of the call. Certain performance parameters, such as throughput (or rate), are negotiated to determine their respective agreed values. The same agreed values must ideally be met as long as the call is active.

Static allocation of network resources is inefficient, and is inadequate for a dynamic networking environment where the user requirements and the quality characteristics of network resources are not static. With user demands that vary with the time of the day, a network is prone to sporadic heavy loads. When network resources (e.g., links) are heavily utilized due to a transient increase of requests for connection establishment and/or re-establishment, time delays and network blocking increase. A network overload control strategy is needed to minimize such degradation in quality of service.

Dynamic routing may be used to steer connections away from saturated links. However, as routing paths meander around saturated links, they tend to be longer. In this respect, more network resources are used, resulting in even higher call blocking rates. A call carried on a long path can potentially block a significant number of other calls that might use the same resources for their connections. Another existing approach is to require incoming calls to wait for connection resources during periods of overload. Although blocking may be somewhat relieved, calls will generally experience a higher delay in connection establishment and re-establishment.

When a link fails, the network attempts to reestablish the affected connections. In a sparsely connected network, a small number of links must share the rerouted traffic. This could lead to an immediate saturation of those links. Many affected connections may thus fail to be reestablished. Those with a high re-establishment priority may still preempt existing connections with a lower retention priority. In any case, some calls would be sacrificed.

A time-of-day call is one that must acquire a connection during a predetermined period of time. In one approach of the prior art, network resources are reserved ahead of time for the time-of-day connection. In order to do that, the network must either add switched facilities when they are needed for the connection, or start accumulating resources for reservation in advance so that enough would be available with a high probability when the resources are needed. In another approach of the prior art, the time-of-day call is assigned a very high establishment priority so that it may acquire the needed resources by preempting existing calls with low retention priority.

Preemptive network resource allocation strategies rely on disruptive retrieval of network resources that have already been allocated to existing calls in order to accommodate new calls of greater importance. Non-preemptive alternatives, such as resource reservation, extended path search, limited waiting for resources, etc., have considerable drawbacks. For voice calls whose rates may be adjusted without affecting the continuing existence of their associated connections, an approach exists that involves the switching between DSI (digital speech interpolation) and non-DSI codings on a network-wide basis. Its control mechanism is strictly triggered by link failures. When there is a link failure, in some devices, every voice call in the network is subject to DSI provided it is permissible. When the failed link is subsequently recovered, the affected voice calls will regain their DSI-free coding.

A different method of dynamically controlling the rate of a connection is found in U.S. Pat. No. 5,115,429, "Dynamic Encoding Rate Control Minimizes Traffic Congestion in a Packet Network," by Michael G. Hluchyj and Nanying Yin. This method, known as dynamic rate control, uses a variable rate coder to adjust the source coding rate based on network feedback information. Temporary relief from internodal link congestion resulting in packet queue build-up, and improvement in statistical gain can be realized at the expense of temporarily degrading the quality of service for the connections that are subject to dynamic rate control. In this control scheme, congestion information is picked up and carried by a single bit in the protocol data units (fast packets or cells) and returned to the source by the destination. The source coder switches between a higher rate and a lower rate depending on the feedback information. If the feedback information indicates congestion, the switch is from the higher rate to the lower rate. If the feedback information indicates otherwise, the switch is the opposite. This technique is used for packet level congestion control and operates over time scales on the order of the round trip transmission delay (e.g., 100 msec), whereas the disclosed invention is used for connection-level overload control and operates over much longer time scales (e.g., minutes).

Thus, there is a need for a device and a method that manage call resource allocation on selected links in a connection-oriented communication network such that existing connections share the burden of releasing resources for accommodating new connections.

DETAILED DESCRIPTION OF A PREFERRED EMBODIMENT

The present invention is designed for controlling the load on selected links in a communication network for a variety of traffic management purposes. The invention applies to communication networks that support diverse traffic types, and a variety of user connections including switched connections that are user initiated and generally do not last very long, and permanent connections that are administered by the network operator and must be maintained at all times.

For some traffic types, such as voice, the rate for its connection is permitted to vary at the expense of changing the audio quality of the information transferred. This is achievable by using a variable rate coder that adjusts the source coding rate when it is triggered to do so. In addition to a number of possible coding rates, voice traffic also has the option to be subject to speech activity detection and use digital speech interpolation (DSI) to improve its statistical gain.

During call setup, a routing function tries to compute a path that satisfies all the QOS constraints, and derives from it an available value for each performance parameter. An acceptable value is specified for each performance parameter such that if the corresponding available value associated with the selected path is less desirable than the acceptable value, the path is not to be used for connection establishment. A performance constraint may be non-negotiable or negotiable. A non-negotiable performance constraint is specified only with the acceptable value. A negotiable performance constraint is specified with a region of values bounded between an acceptable value and a requested value. This region of values is referred to as the agreeable region.

For non-negotiable performance constraints, if the available value is at least as desirable as the acceptable value, the acceptable value is taken to be the agreed value, i.e., one that the end-users will accept and the network will support. Each negotiable performance constraint is subject to negotiation that determines an agreed value from within the agreeable region provided an acceptable path is available. During a negotiation, if the available value is more desirable than the requested value, the call may be accepted, but only the requested value would be offered as the agreed value. When the available value falls within the agreeable region, the agreed value is arbitrary as long as it is within the agreeable region as well. For connections that are subject to the dynamic rate adjustment described in this invention, when the available rate falls within the agreeable region, the agreed rate is set to the acceptable rate. Thus, with the present invention, the agreed rate is adjusted to an upper limit (i.e., requested rate) or, alternatively, a lower limit (i.e., acceptable rate).

Figure 1:
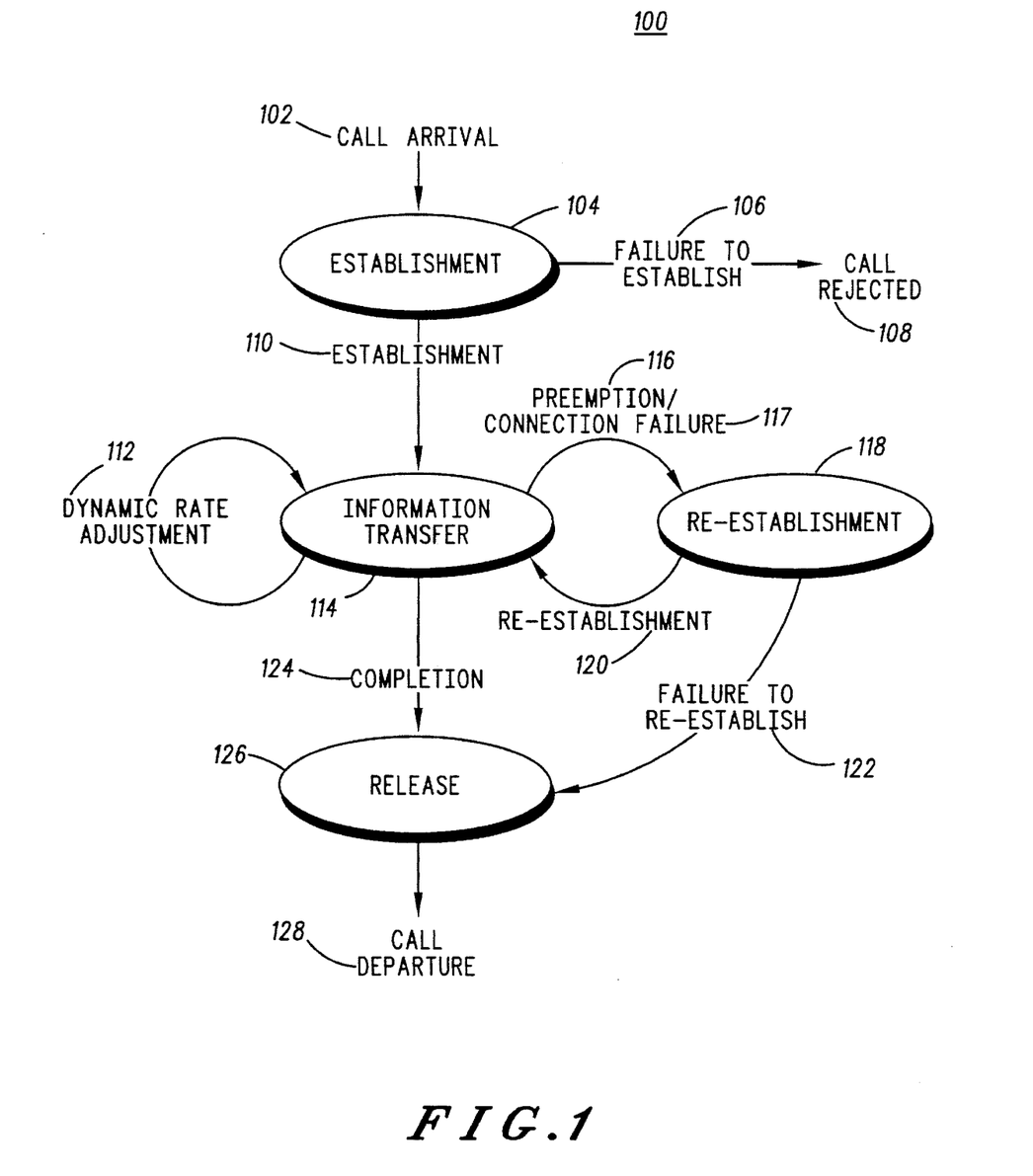
FIG. 1 is a diagram of connection states in accordance with the present invention.

Dynamic rate adjustment is a novel feature for connection management. FIG. 1, numeral 100, is a connection state diagram in accordance with the present invention. The dynamic rate adjustment transition (112) from the Information Transfer state (114) to itself is a novel element of the present invention.

When a call arrives (102), it enters the Establishment state (104). If there are not enough resources to support the call (failure to establish—106), it will be rejected (108). Otherwise, upon successful connection establishment (110) (i.e., a path is available such that all QOS constraints are satisfied), it enters the Information Transfer state (114). When a call in the Information Transfer state is completed (124), it enters the Release state (126), and the connection is subsequently taken down (call departure—128). If any QOS degradation leads to a connection failure (117) or the call is preempted (116), the call enters the Re-establishment state (118), so that the network may attempt to reestablish the connection. When a call is in the Re-establishment state (118), the network attempts to find a new acceptable path for connection re-establishment. Upon successful re-establishment (120), the call reenters the Information Transfer state (114). Otherwise (122), it enters the Release state (126) after attempting unsuccessfully to reestablish the connection for a predetermined period that is known as the connection re-establishment delay.

Preemption (116) and blocking of calls (106, 122) when the network is heavily loaded may be minimized if the network is able to partially retrieve allocated resources from existing connections while maintaining their acceptable QOS. For example, the temporary reduction of the rate for an existing permanent connection to make room for an incoming switched connection that does not last long may be quite reasonable.

Figure 2:
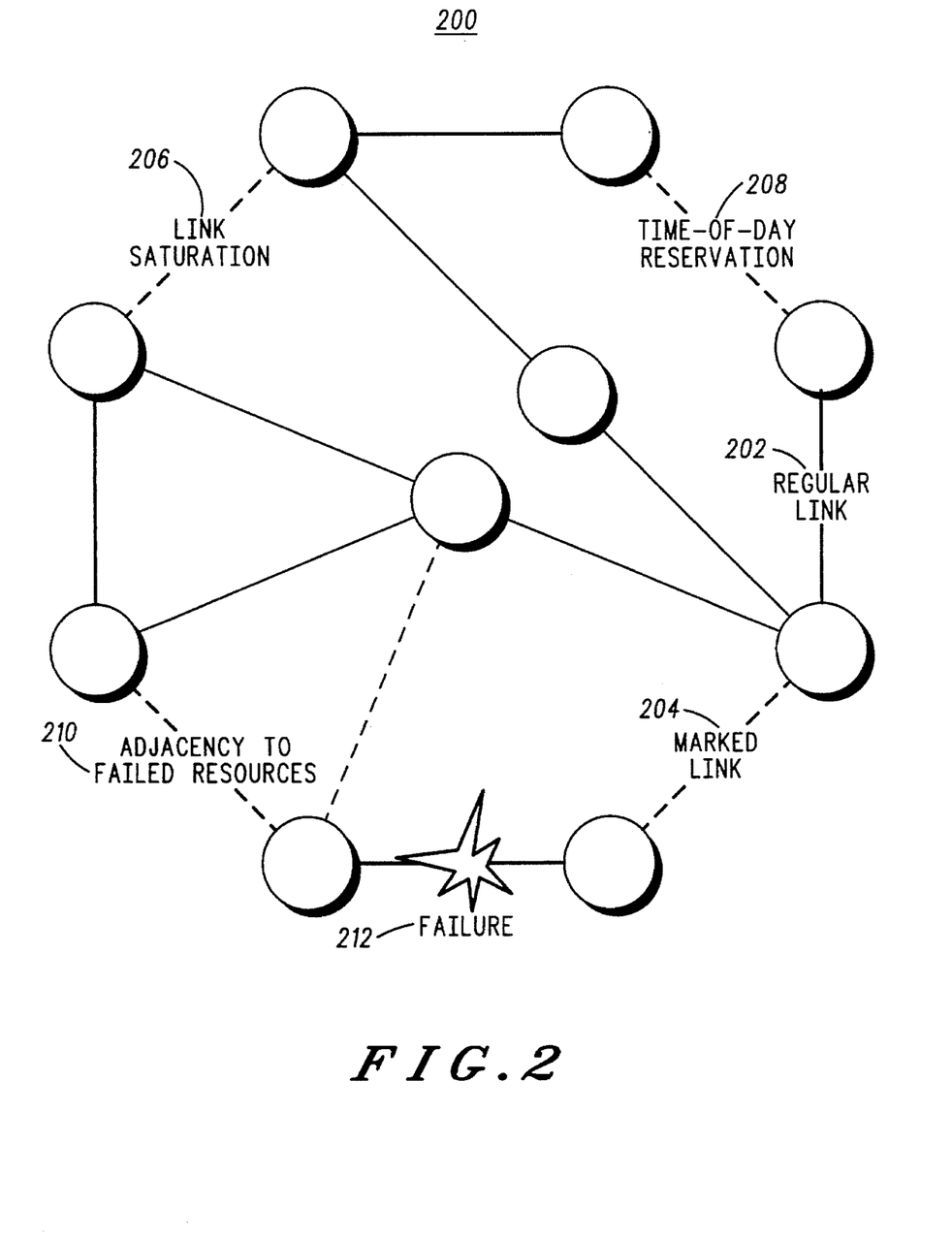
FIG. 2 is a diagram of examples of marked links.

Dynamic rate adjustment (112) is a connection management procedure for controlling the rates of certain connections in order to free up resources on selected, or marked, links for reallocation. There are a variety of reasons for marking a link. FIG. 2, numeral 200, is a diagram showing examples representing regular links (202, . . . ) and marked links (204, . . . ). The examples shown in FIG. 2 are by no means exhaustive. A link may be marked when it is overloaded (link saturation-206) in the sense that the available capacity on the link has fallen below a predetermined threshold. A link may be marked for a period specified by the time-of-day (208). This is useful for freeing up resources in anticipation of the arrival of a time-of-day call such as one for video conferencing. A link may be marked when an adjacent link has failed (204, 210, 212), so that resources are made available for potential rerouted traffic.

The marking of a link is managed by the node that is responsible for monitoring the link's status. A one-bit control information, indicating whether the link is marked or not, is added to the topology update messages broadcast by the node to all other nodes in the network. By using additional bits for the control information, one could communicate multiple levels of link loading in the topology update messages.

The source of each connection, whose rate is subject to dynamic adjustment, examines the path supporting the connection periodically or based on a predetermined event trigger. If at least one link along the path is marked, the rate of the connection is reduced from its previously agreed level to its acceptable level, provided the previously agreed level is higher than the acceptable level. In other words, the agreed rate is adjusted down to the acceptable rate. If all the links along the path are unmarked, the rate of the connection is increased from its previously agreed level to the requested level, provided the previously agreed level is lower than the requested level. The rate is said to be adjusted (increased) from its previously agreed value up to the requested value. In the process of dynamic rate adjustment, the call remains in the Information Transfer state. Note that dynamic rate adjustment does not reroute the connection along a new path. The only change in QOS associated with the connection is the agreed rate.

For example, the dynamic rate adjustment scheme may be implemented based on available capacity. The available capacity associated with a path is the smallest available capacity on any link along the path. When the available capacity is plentiful, the agreed rate is normally permitted to be the same as the requested rate. When the available capacity is small, the agreed rate is normally limited to the acceptable value. If there is only one threshold, the rate adjustment for a connection may suffer from oscillations when the available capacity fluctuates around the threshold. Thus, two thresholds may be used to create a hysteresis effect. For example, the lower threshold may be 20% of link capacity, and the upper threshold may be 30% of link capacity.

Figure 3:
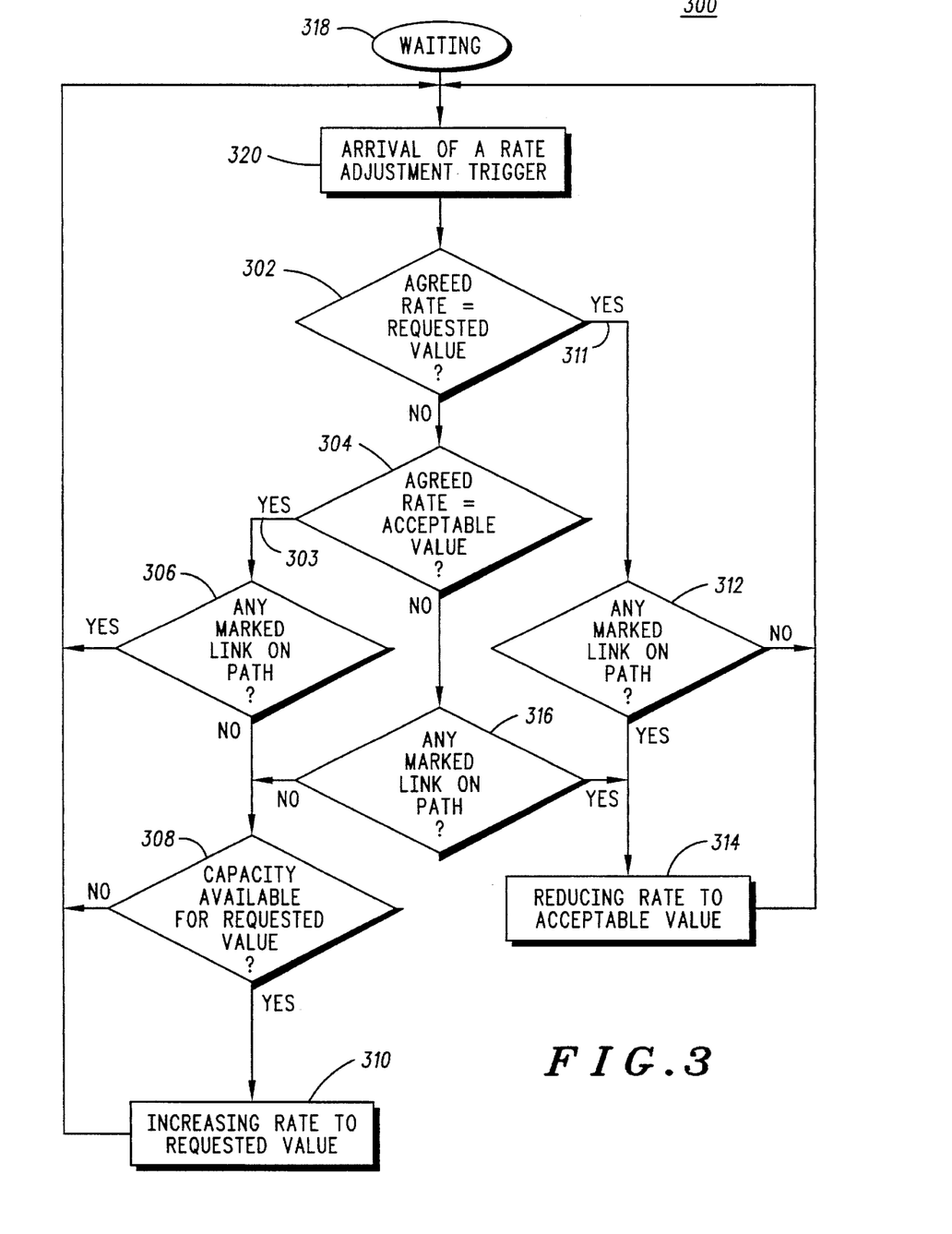
FIG. 3 shows a flow chart of the steps of a method for dynamic rate adjustment for overload control in a connection-oriented communication network in accordance with the present invention.

FIG. 3, numeral 300, shows a flow chart of the steps of a method for dynamic rate adjustment for overload control in a connection-oriented communication network in accordance with the present invention. The method provides management of call-level resource allocation on selected links such that existing connections share the burden of releasing resources for accommodating new connections. The method includes the steps of: (A) recognizing a dynamic rate adjustment trigger signal (320) that indicates when the source of a given connection must examine the path supporting the connection, (B) determining whether the previously agreed rate associated with the connection is equal to a predetermined requested value (302), and (C) where the previously agreed rate associated with the connection is equal to the predetermined requested value, proceeding through the steps of Group 2 (see below), and (D) where the previously agreed rate associated with the connection is unequal to the predetermined requested value, determining whether the previously agreed rate associated with the connection is equal to a predetermined acceptable value (304). Where the previously agreed rate associated with the connection is equal to the predetermined acceptable value, the steps of Group 1 below are utilized. Where the previously agreed rate associated with the connection is unequal to the predetermined acceptable value (i.e., the previously agreed rate associated with the connection is other than the acceptable and requested values), the steps of Group 3 are utilized.

In Group 1, where the previously agreed rate associated with the connection is equal to a predetermined acceptable value, further steps include determining whether any link along the path supporting the connection is marked (306) and one of: (1) where at least one link along the path is marked, returning to the state where the source waits for the arrival of the next rate adjustment trigger signal, (318), and recycling to step (A) above (determining whether the previously agreed rate associated with the connection is equal to a predetermined requested value (302)), and (2) where all links along the path are unmarked, determining whether a predetermined available capacity associated with the path is greater than or equal to a predetermined requested value (308). In step (2), the steps further include the steps of: (3) where the predetermined available capacity associated with the path is greater than or equal to the requested value, increasing the agreed rate associated with the connection to the requested value (310) and returning to the state where the source waits for the arrival of the next rate adjustment trigger signal (318), and recycling to step (A) above (determining whether the previously agreed rate associated with the connection is equal to a predetermined requested value (302)) and (4) where the predetermined available capacity associated with the path is less than the requested value, returning to the state where the source waits for the arrival of the next rate adjustment trigger signal (318) and recycling to step (A) above (determining whether the previously agreed rate associated with the connection is equal to the requested value (302)).

In Group 2, where the previously agreed rate is equal to a predetermined requested value, further steps include determining whether any link along the path supporting the connection is marked (312) and one of: (1) where all links along the path are unmarked, returning to the state where the source waits for the arrival of the next rate adjustment trigger signal (318) and recycling to step (A) above (determining whether the previously agreed rate associated with the connection equals a predetermined requested value (302)) and (2) where at least one link along the path is marked, reducing the agreed rate associated with the connection to the predetermined acceptable value (314) and returning to the state where the source waits for the arrival of the next rate adjustment trigger signal (318) and recycling to step (A) above (determining whether the previously agreed rate associated with the connection equals a predetermined requested value (302)).

In Group 3, where the previously agreed value associated with the connection is a value other than the predetermined requested value and the predetermined acceptable value, further steps include determining whether any link along a path supporting the connection is marked (316) and one of: (1) where all links along the path are unmarked, determining whether the available capacity associated with the path is greater than or equal to the predetermined requested value and, where the available capacity associated with the path is less than the predetermined requested value, returning to the state where the source waits for the arrival of the next rate adjustment trigger signal (318) and recycling to step (A) above (determining whether the previously agreed rate associated with the connection equals a predetermined requested rate (302)), and where the available capacity associated with the path is greater than or equal to the requested value, increasing the rate to the requested value (310) and returning to the state where the source waits for the arrival of the next rate adjustment trigger signal (318), and recycling to step (A) above (determining whether the previously agreed rate associated with the connection equals a predetermined requested rate (302)), and (2) where at least one link along the path is marked, reducing the agreed rate associated with the connection to the predetermined acceptable value (314) and returning to the state where the source waits for the arrival of the next rate adjustment trigger signal (318) and recycling to step (A) above (determining whether the previously agreed rate associated with the connection equals a predetermined requested value (302)).

Note that the agreed, acceptable, and requested values for the rate are associated with a connection or the path that supports the connection, not simply a single link. The agreed value associated with a call for the method shown in FIG. 3 is initially determined by means of a negotiation procedure, utilizing the steps of: (1) where the available capacity associated with the path is greater than a predetermined requested value, setting the agreed value to the predetermined requested value, (2) where the available capacity associated with the path is less than the predetermined requested value but not less than a predetermined acceptable value, setting the agreed value to the predetermined acceptable value, and (3) where the available capacity associated with the path is less than the predetermined acceptable value, the call is rejected. During rate adjustment, the previously agreed rate may be adjusted to a new agreed rate. When the next rate adjustment is needed, the new agreed rate set by the previous rate adjustment becomes the previously agreed rate for the current rate adjustment.

Figure 4:
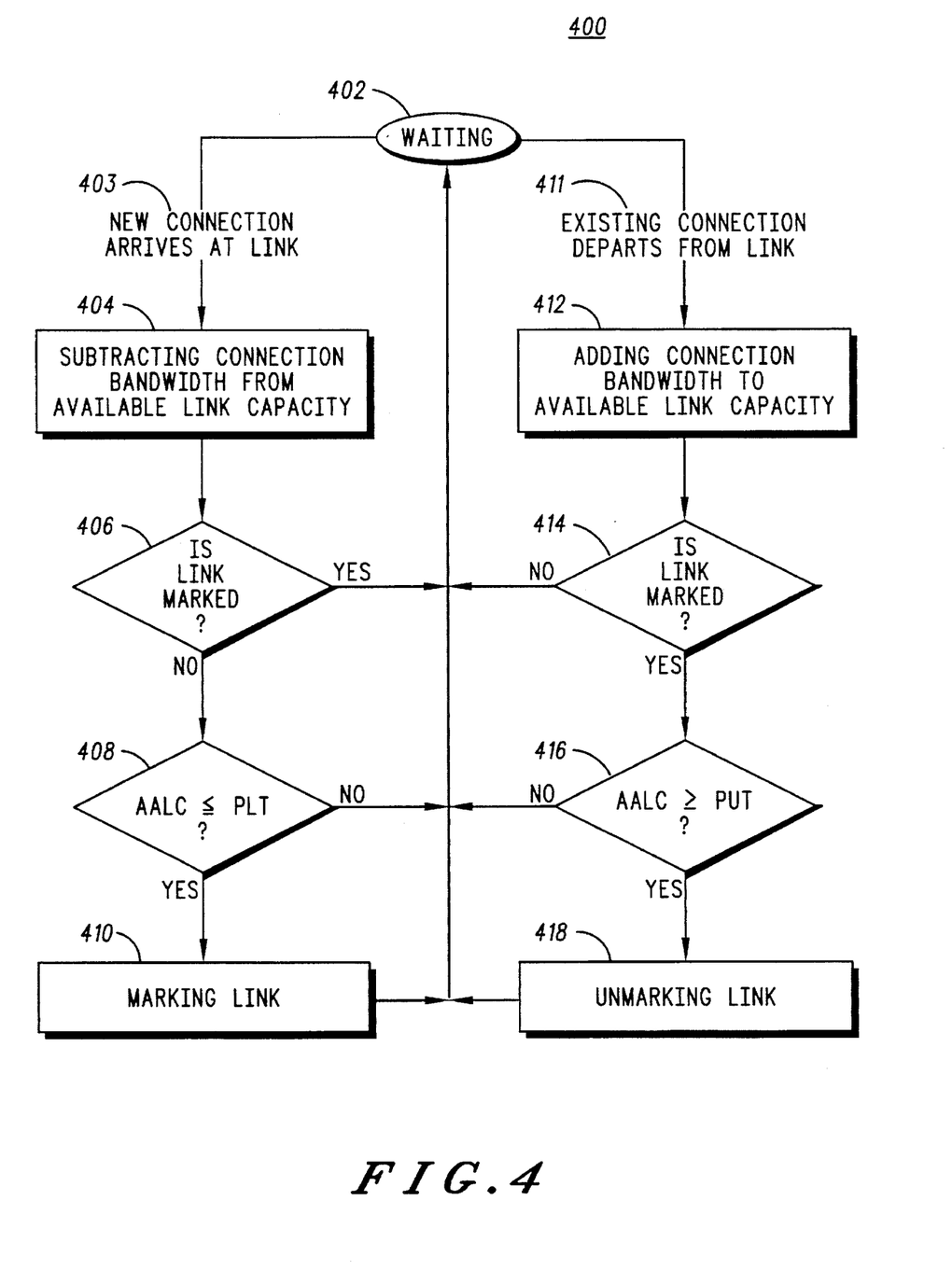
FIG. 4 shows a flow chart of steps for marking links based on available link capacity for utilization in the steps of the method shown in FIG. 3.

FIG. 4, numeral 400, shows a flow chart of steps for marking a given link based on available link capacity for utilization in the steps of the method shown in FIG. 3. The status of each link is monitored by a predetermined node. Where a new connection arrives at a given link (403) (i.e., resource of the given link are allocated to a new connection), the connection bandwidth is subtracted from the predetermined available link capacity to determine an adjusted available link capacity (AALC)(404), and the node that monitors the link's status determines whether the link is marked (406). Where the link is marked, the node returns to a waiting mode (402), and, where the link is unmarked, the node determines whether the AALC is less than a predetermined lower threshold (PLT) (408). Where the AALC is greater than a predetermined lower threshold (PLT) (408), the node returns to the waiting mode (402). Where the AALC is less than or equal to a predetermined lower threshold (PLT) (408), the node marks the link (410) and returns to the waiting mode (402). Where an existing connection departs from a link, the node that monitors the link's status adds the connection bandwidth from the predetermined available link capacity to determine the adjusted available link capacity (AALC) (412) and determines whether the link is marked (414). Where the link is unmarked, the node returns to a waiting mode (402). Where the link is marked, the node determines whether the AALC is greater than or equal to a predetermined upper threshold (PUT) (416). Where the AALC is less than a predetermined upper threshold (PUT) (416), the node returns to the waiting mode (402). Where the AALC is greater than or equal to the PUT, the node unmarks the link (418) and returns to the waiting mode (402).

Figure 5:
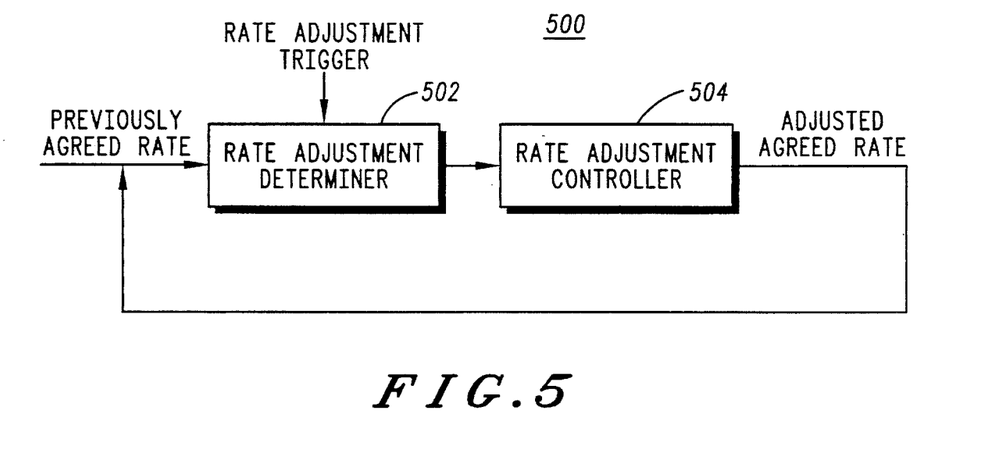
FIG. 5 is a block diagram of an embodiment of a device in accordance with the present invention.

FIG. 5 is a block diagram of an embodiment of a device in accordance with the present invention. The device provides dynamic rate adjustment for overload control in a connection-oriented communication network by managing call-level resource allocation on selected links such that existing connections share the burden of releasing resources for accommodating new connections. The device includes a rate adjustment determiner (502) and a rate adjustment controller (504).

The rate adjustment determiner (502) is operably coupled to the rate adjustment controller (504). Upon the arrival of a rate adjustment trigger signal, indicating that it is time for the source associated with the connection to attempt rate adjustment, the rate adjustment determiner determines if rate adjustment is needed, and if so, determines a new agreed rate for the connection. The rate adjustment controller (504) is operably coupled to the rate adjustment determiner (502). The rate adjustment controller (504) changes the previously agreed rate to the new agreed rate determined by the rate adjustment determiner. The new (or adjusted) agreed rate becomes the input (i.e., previously agreed rate) to the rate adjustment determiner when the next rate adjustment trigger signal arrives. The rate adjustment trigger is basically a mechanism that issues a rate adjustment request (trigger signal) to the rate adjustment determiner whenever a predetermine event occurs. For example, the event may be the expiration of a timer, which is reset each time after a rate adjustment attempt is completed.

When rate adjustment is being considered, the rate adjustment determiner (502) determines a new agreed rate such that, where the previously agreed rate is equal to a predetermined acceptable value, the rate adjustment determiner determines whether any link along the path of the connection is marked and one of: (1) where at least one link along the path of the connection is marked, returns to the state where the source waits for the arrival of the next rate adjustment trigger signal, and (2) where all links along the path of the connection are unmarked, determines whether a predetermined available capacity associated with the path is greater than or equal to a predetermined requested value. Where the predetermined available capacity associated with the path is greater than or equal to the requested value, the rate adjustment determiner (502) signals the rate adjustment controller to increase the agreed rate to the requested value, and then returns to the state where the source waits for the arrival of the next rate adjustment trigger signal. Where the predetermined available capacity associated with the path is less than the predetermined requested value, the rate adjustment determiner determines that the previously agreed value is to be maintained, and then returns to the state where the source waits for the arrival of the next rate adjustment trigger signal.

The rate adjustment determiner (502) determines a new agreed rate such that, where the previously agreed rate is equal to a predetermined requested value, the rate adjustment determiner (502) determines whether any link along the path of the connection is marked and one of: (1) where all links along the path of the connection are unmarked, returns to the state where the source waits for the arrival of the next rate adjustment trigger signal, and (2) where at least one link along the path of the connection is marked, signals the rate adjustment controller (504) to reduce the agreed rate to a predetermined acceptable value, and then returns to the state where the source waits for the arrival of the next rate adjustment trigger signal.

The rate adjustment determiner (502) determines a new agreed rate such that, where the previously agreed rate is a value other than the predetermined requested value and the predetermined acceptable value, the rate adjustment determiner (502) determines whether any link along the path of the connection is marked and one of: (1) where all links along the path of the connection are unmarked and the available capacity associated with the path is greater than the requested value, signals the rate adjustment controller (504) to increase the agreed rate to the requested value, and then returns to the state where the source waits for the arrival of the next rate adjustment trigger signal, and (2) where all links along the path of the connection are unmarked and the available capacity associated with the path is less than the requested value, leaves the agreed rate unchanged, and then returns to the state where the source waits for the arrival of the next rate adjustment trigger signal. Where at least one link along the path of the connection is marked, the rate adjustment determiner (502) signals the rate adjustment controller (504) to reduce the agreed rate to the acceptable value, and then returns to the state where the source waits for the arrival of the next rate adjustment trigger signal.

In the device of the present invention, the agreed rate is determined as set forth above in the method. A link is marked by a predetermined node that monitors its status.

Figure 6:
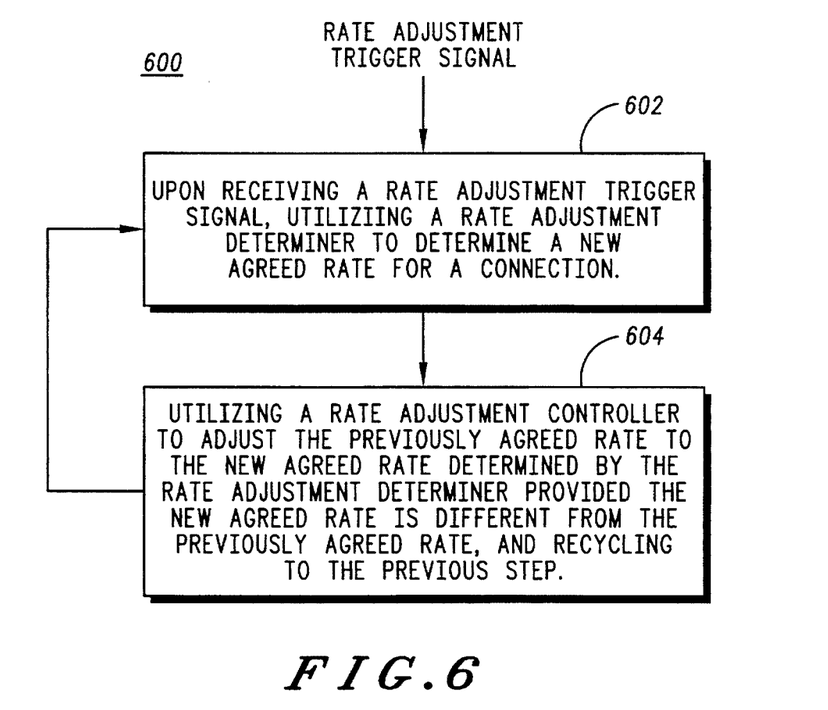
FIG. 6 is a flow chart showing steps of another embodiment of the method of the present invention.

FIG. 6, numeral 600, is a flow chart showing steps of another embodiment of the method of the present invention. The method for, upon receiving a rate adjustment trigger signal, dynamic rate adjustment for overload control in a connection-oriented communication network by managing call-level resource allocation on selected links such that existing connections share the burden of releasing resources for accommodating new connections, includes the steps of: (A) utilizing a rate adjustment determiner, upon receiving a rate adjustment trigger signal, to determine a new agreed rate for a connection (602), and (B) utilizing a rate adjustment controller to adjust the previously agreed rate according to the new agreed rate determined by the rate adjustment determiner, provided that the new agreed rate is different from the previously agreed rate, and then recycling to step (A) (604). Determination of the new agreed rate for the connection is described in more detail above.

The invention is different from the prior art of dynamic rate control in a few aspects. Dynamic rate control manages packet level congestion, whereas the invention is used to manage call level overload. While dynamic rate control is a congestion control scheme that imposes restrain on the sources after congestion is detected, the invention, implemented based on marking saturated links, is an overload avoidance scheme that imposes restrain on the sources normally before link saturation actually occurs. The invention is not limited to addressing overload or congestion control issues.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A device for dynamic rate adjustment for overload control in a connection-oriented communication network by managing call-level resource allocation on selected link, each link being associated with a predetermined node for marking the link's status, such that existing connections share the burden of releasing resources for accommodating new connections, comprising:

A) a rate adjustment determiner, operably coupled to a rate adjustment controller, for, upon receiving a rate adjustment trigger signal, determining a new agreed rate for the connection and providing the new agreed rate to the rate adjustment controller, and B) the rate adjustment controller, operably coupled to the rate adjustment determiner, for adjusting the previously agreed rate to a new agreed rate determined by the rate adjustment determiner, wherein the rate adjustment determiner determines a new agreed rate such that:

C) where the previously agreed rate is equal to a predetermined acceptable value, the rate adjustment determiner determines whether any link along a path supporting the connection is marked and one of C1–C2;

C1) where at least one link is marked, leaving the previously agreed rate unchanged, C2) where all links along the path are unmarked, determines whether a predetermined available capacity associated with the path is greater than or equal to a predetermined requested value and one of C2a–C2b;

C2a) where the predetermined available capacity associated with the path is greater than or equal to the requested value, determines that the new agreed rate is equal to the requested value, and signals the rate adjustment controller to adjust the agreed rate accordingly, C2b) where the predetermined available capacity associated with the path is less than the requested value, leaving the previously agreed rate unchanged, D) where the previously agreed rate is equal to a predetermined requested value, the rate adjustment determiner determines whether any link along a path supporting the connection is marked and one of D1–D2;

D1) where all links along the path are unmarked, leaving the previously agreed rate unchanged, D2) where at least one link is marked, determines that the new agreed rate is equal to a predetermined acceptable value, and signals the rate adjustment controller to adjust the agreed rate accordingly, E) where the previously agreed rate is a value other than a predetermined requested value and a predetermined acceptable value, the rate adjustment determiner determines whether any link along a path supporting the connection is marked and one of E1–E3;

E1) where all links along the path are unmarked and the available capacity associated with the path is less than the requested value, leaving the previously agreed rate unchanged, E2) where all links along the path are unmarked and the available capacity associated with the path is greater than or equal to the requested value, determines that the new agreed rate is equal to the requested value, and signals the rate adjustment controller to adjust the agreed rate accordingly, E3) where at least one link is marked, determines that the new agreed rate is equal to the acceptable value, and signals the rate adjustment controller to adjust the agreed rate accordingly, wherein the new agreed rate is determined utilizing the steps of one of F–G:

F) where the available capacity associated with the path is greater than or equal to a predetermined requested value, setting the agreed rate to the requested value, G) where the available capacity associated with the path is less than a predetermined requested value, leaving the agreed rate unchanged.

2. The device of claim 1 wherein the predetermined node associated with a given link marks the given link based on available capacity such that at least one of A–B:

A) where a new connection arrives at the given link, the predetermined node subtracts the connection bandwidth from the predetermined available link capacity to determine an adjusted available link capacity (AALC), determines whether the link is marked and one of A1–A2:

A1) where the link is marked, returns to a waiting mode,

A2) where the link is unmarked, determines whether the AALC is less than a predetermined lower threshold (PLT) and one of A2a and A2b:

A2a) where the AALC is greater than the PLT, returns to the waiting mode,

A2b) where the AALC is less than or equal to the PLT, marks the link and returns to the waiting mode, and B) where an existing connection departs from the given link, the predetermined node adds the connection bandwidth from the predetermined available link capacity to determine the adjusted available link capacity (AALC), determines whether the link is marked and one of B1 and B2:

B1) where the link is unmarked, returns to a waiting mode,

B2) where the link is marked, determines whether the AALC is less than a predetermined upper threshold (PUT) and one of B2a and B2b:

B2a) where the AALC is less than the PUT, returns to the waiting mode,

B2b) where the AALC is greater than or equal to the PUT, unmarks the link and returns to the waiting mode.

3. A method for dynamic rate adjustment for overload control in a connection-oriented communication network by managing call-level resource allocation on selected links such that existing connections share the burden of releasing resources for accommodating new connections, comprising the steps of:

A) selecting a new agreed rate in accordance with a predetermined scheme for a connection upon receiving a rate adjustment trigger signal, utilizing the steps of one of B–D, and recycling to step A upon completion of a rate adjustment cycle, B) where the previously agreed rate is equal to a predetermined acceptable value, determining whether any link along the path supporting the connection is marked and one of B1–B2:

B1) where at least one link is marked, returning to the state where the source waits for the arrival of the next rate adjustment trigger signal, and completing the rate adjustment cycle, B2) where all links along the path are unmarked, determining whether a predetermined available capacity associated with the path is greater than or equal to a predetermined requested value and one of B2a–B2b:

B2a) where the predetermined available capacity associated with the path is greater than or equal to the requested value, increasing the agreed rate associated with the connection to the requested value, returning, to the state where the source waits for the arrival of the next rate adjustment trigger signal, and completing the rate adjustment cycle, B2b) where the predetermined available capacity associated with the path is less than the requested value, returning to the state where the source waits for the arrival of the next rate adjustment trigger signal, and completing the rate adjustment cycle, C) where the previously agreed rate is equal to a predetermined requested value, determining whether any link along a path supporting the connection is marked and one of C1–C2:

C1) where all links along the path are unmarked, returning to the state where the source waits for the arrival of the next rate adjustment trigger signal, and completing the rate adjustment cycle, C2) where at least one link is marked, reducing the agreed rate associated with the connection to a predetermined acceptable value and returning to the state where the source waits for the arrival of the next rate adjustment trigger signal, and completing the rate adjustment cycle, D) where the previously agreed rate is a value other than a predetermined requested value and a predetermined acceptable value, determining whether any link along a path supporting the connection is marked and one of D1–D2:

D1) where all links along the path are unmarked, determining whether the available capacity associated with the path is greater than or equal to the requested value and, where the available capacity associated with the path is less than the requested value, returning to the state where the source waits for the arrival of the next rate adjustment trigger signal, and completing the rate adjustment cycle, and where the available capacity associated with the path is greater than or equal to the requested value, increasing the agreed rate associated with the connection to the requested value and returning to the state where the source waits for the arrival of the next rate adjustment trigger signal, and completing the rate adjustment cycle, D2) where at least one link along the path is marked, reducing the agreed rate associated with the connection to the acceptable value and returning to the state where the source waits for the arrival of the next rate adjustment trigger signal, and completing the rate adjustment cycle, wherein the predetermined scheme for determining the new agreed rate includes the steps of one of E–F:

E) where the available capacity associated with the path is greater than a predetermined requested value, setting the new agreed rate to the requested value, F) where the available capacity associated with the path is less than a predetermined requested value, leaving the agreed rate unchanged, wherein further including the stop of marking links based on available capacity such that:

G) where a new connection arrives at a link,

G1) subtracting the connection bandwidth from the predetermined available link capacity to determine an adjusted available link capacity (AALC), G2) determining whether the link is marked and one of G2a and G2b:

G2a) where the link is marked, returning to a waiting mode,

G2b) where the link is unmarked, determining whether the AALC is less than or equal to a predetermined lower threshold (PLT) and one of G2b1 and G2b2:

G2b1) where the AALC is greater than or the PLT, returning to the waiting mode,

G2b2) where the AALC is less than or equal to the PLT, marking the link and returning to the waiting mode, and H) where an existing connection departs from a link, H1) adding the connection bandwidth from the predetermined available link capacity to determine the adjusted available link capacity (AALC), H2) determining whether the link is marked and one of H2a and H2b:

H2a) where the link is unmarked, returning to a waiting mode,

H2b) where the link is marked, determining whether the AALC is less than a predetermined upper threshold (PUT) and one of H2b1 and H2b2:

H2b1) where the AALC is less than the PUT, returning to the waiting mode,

H2b2) where the AALC is greater than or equal to the PUT, unmarking the link and returning to the waiting mode.

4. A method for dynamic rate adjustment for overload control in a connection-oriented communication network by managing call resource allocation on selected links, each link being associated with a predetermined node for marking the link' status, such that existing connections share the burden of releasing resources for accommodating new connections, comprising the steps of:

8A) utilizing a rate adjustment determiner to determine a new agreed rate for a connection upon receiving a rate adjustment trigger signal, and     8B) utilizing a rate adjustment controller to adjust the previously agreed rate to the new agreed rate determined by the rate adjustment determiner, provided that the new agreed rate is different from the previously agreed rate, and then recycling to step (8A), wherein the rate adjustment determiner determines a new agreed rate, upon receiving a rate adjustment trigger signal, utilizing the steps of:

8C) where the previously agreed rate is equal to a predetermined acceptable value, determining whether any link along a path supporting the connection is marked and one of 8C1–8C2:

8C1) where at least one link along the path is marked, returning to the state where the source waits for the arrival of the next rate adjustment trigger signal,         8C2) where all links along the path are unmarked, determining whether a predetermined available capacity associated with the path is greater than or equal to a predetermined requested value and one of 8C2a–8C2b:

8C2a) where the predetermined available capacity associated with the path is greater than or equal to the predetermined requested value, increasing the agreed rate associated with the connection to the predetermined requested value and returning to the state where the source waits for the arrival of the next rate adjustment trigger signal,             8C2b) where the predetermined available capacity associated with the path is less than the predetermined requested value, returning to the state where the source waits for the arrival of the next rate adjustment trigger signal,     8D) where the previously agreed rate is equal to a predetermined requested value, determining whether any link alone a path supporting the connection is marked and one of 8D1–8D2:

8D1) where all links along the path are unmarked, returning to the state where the source waits for the arrival of the next rate adjustment trigger signal,         8D2) where at least one link is marked, reducing the agreed rate to a predetermined acceptable value and returning to the state where the source wait for the arrival of the next rate adjustment trigger signal,     8E) where the previously agreed rate is a value other than a predetermined requested value and a predetermined acceptable value, determining whether any link along a path supporting the connection is marked and one of 8E1–8E3:

8E1) where all links along the path are unmarked and the available capacity associated with the path is less than the requested value, leaving the agreed rate unchanged and returning to the state where the source waits for the arrival of the next rate adjustment trigger signal,         8E2) where all links along the path are unmarked and the available capacity associated with the path is greater than or equal to the requested value, increasing the agreed rate associated with the connection to the requested value and returning to the state where the source waits for the arrival of the next rate adjustment trigger signal,         8E3) where at least one link along the path is marked, reducing the agreed rate associated with the connection to the predetermined acceptable value and returning to the state where the source waits for the arrival of the next rate adjustment trigger signal, wherein the new agreed rate is determined utilizing the steps of one of 8F–8G:

8F) where the available capacity associated with the path is greater than a predetermined requested value, setting the agreed rate to the requested value,     8G) where the available capacity associated with the path is less than a predetermined requested value, leaving the previously agreed rate unchanged.

5. The method of claim 4 including the step of a predetermined node marking links based on available capacity such that at least one of A–B:

A) where a new connection arrives at a link, the predetermined node subtracting the connection bandwidth from the predetermined available link capacity to determine an adjusted available link capacity (AALC) and determining whether the link is marked and one of A1–A2:

A1) where the link is marked, returning to a waiting mode,         A2) where the link is unmarked, determining whether the AALC is less than or equal to a predetermined lower threshold (PLT) and one of A2a and A2b:

A2a) where the AALC is greater than the PLT, returning to the waiting mode,             A2b) where the AALC is less than or equal to the PLT, marking the link and returning to the waiting mode, and     B) where an existing connection departs from a link, the predetermined node adding the connection bandwidth from the predetermined available link capacity to determine the adjusted available link capacity (AALC) and determining whether the link is marked and one of B1 and B2:

B1) where the link is unmarked, returning to a waiting mode,         B2) where the link is marked, determining whether the AALC is less than a predetermined upper threshold (PUT) and one of B2a and B2b:

B2a) where the AALC is less than the PUT, returning to the waiting mode,             B2b) where the AALC is greater than or equal to the PUT, unmarking the link and returning to the waiting mode.

* * * * *

UNITED STATES PATENT AND TRADEMARK OFFICE
CERTIFICATE OF CORRECTION

PATENT NO. : 5,488,609
DATED : Jan. 30, 1996
INVENTOR(S) : Michael G. Hluchyj, Wellesley, Mass.

It is certified that error appears in the above-indentified patent and that said Letters Patent is hereby corrected as shown below:

In claim 1:
    on line 3, change "link" to --links--.
In claim 3:
    on line 86, change "stop" to --step--;
    on line 100, delete "or."
In claim 4:
    on line 5, change "link'status" to --link's status--;
    on line 45, change "alone" to --along--;
    on line 52, change "wait" to --waits--.

Signed and Sealed this

Eighth Day of December, 1998

*Attest:*

BRUCE LEHMAN

*Attesting Officer*      Commissioner of Patents and Trademarks